UNITED STATES PATENT OFFICE.

SERVETUS T. ACHOR, OF BROOKLYN, NEW YORK.

PROCESS OF MAKING SOLUBLE CHOCOLATE.

SPECIFICATION forming part of Letters Patent No. 479,581, dated July 26, 1892.

Application filed February 6, 1892. Serial No. 420,554. (No specimens.)

*To all whom it may concern:*

Be it known that I, SERVETUS T. ACHOR, a citizen of the United States, residing at the city of Brooklyn, in the county of Kings and State of New York, have invented certain new and useful Improvements in Processes of Preparing Beverages, of which the following is a specification.

My invention relates to a process for preparing a beverage composed of chocolate, cream, sugar, and water, and relates particularly to steps whereby a process of boiling the water to dissolve the other ingredients is avoided.

I take chocolate or cacoa liquor, sugar, and cream or condensed milk, in about the proportions of one pound of chocolate, one and one-half pounds of sugar, and one pint of cream, and I combine these with heat into a thick paste. I then work into this paste an additional quantity of sugar, which serves to absorb the cocoa-butter and render the whole mass more readily dissolvable, while the additional sugar, retaining its granular characteristics, gives firmness to the compound, so that it can be molded into pieces of suitable size. I then immerse these cakes or pieces in a dense sirup of sugar and water in order that they may receive a crystalline coating which, after drying, becomes hard, when they are removed and dried. The crystallization takes place on the surface of the molded pieces while they are immersed in the sirup. When the cake is to be used, it is simply placed in a cup or vessel of hot water, which will be found to readily attack, disintegrate, and dissolve both the outer coat and the cake, softening the entire mass, and on stirring the beverage will be complete. This treatment renders the compound more susceptible to the dissolving power of the water after it has penetrated the crystalline shell, so that the whole mass will quickly and readily combine with the water, forming a delicious chocolate beverage without the necessity of boiling.

I do not in this specification make claim to the article resulting from the hereinbefore described process, as said article forms the subject-matter of my application for patent filed February 6, 1892, Serial No. 420,555.

Having thus described my invention, what I claim, and desire to secure by Letters Patent of the United States, is—

The process of forming a chocolate compound readily soluble in water, which consists in first making a paste of chocolate or cocoa, cream, and sugar, then incorporating an additional amount of sugar, molding to form cakes, immersing such cakes in a thick sirup to obtain a crystalline coating, and then drying the cakes, as set forth.

SERVETUS T. ACHOR.

Witnesses:
   WM. D. NEILLEY,
   ISAAC B. RIPINSKY.